UNITED STATES PATENT OFFICE.

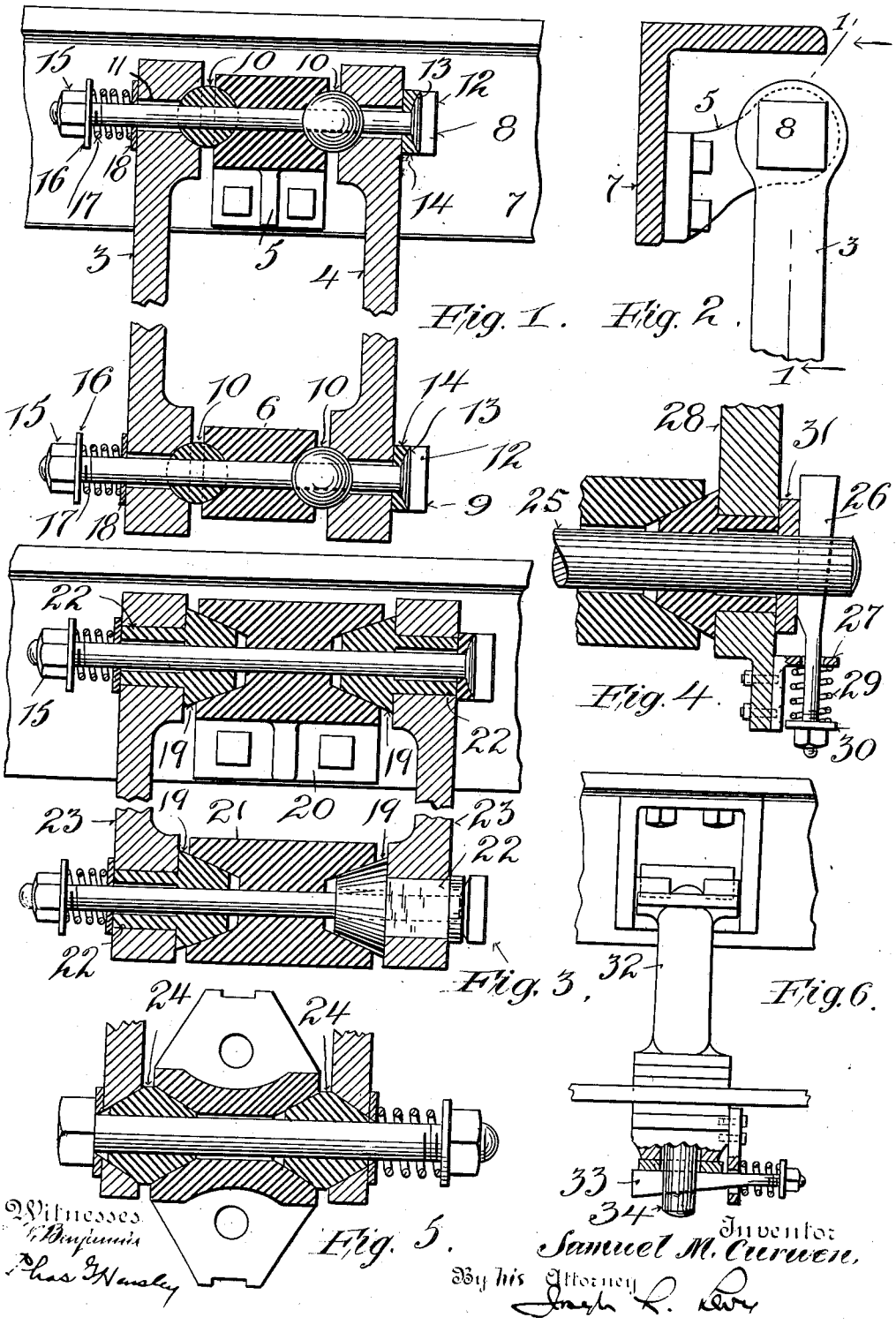

SAMUEL M. CURWEN, OF PHILADELPHIA, PENNSYLVANIA, ASSIGNOR TO JOHN A. BRILL, OF PHILADELPHIA, PENNSYLVANIA.

AUTOMATIC BRAKE-HANGER.

No. 852,933.           Specification of Letters Patent.           Patented May 7, 1907.

Application filed March 19, 1906. Serial No. 306,701.

*To all whom it may concern:*

Be it known that I, SAMUEL M. CURWEN, a citizen of the United States, and a resident of the city of Philadelphia, county of Philadelphia, and State of Pennsylvania, have invented a certain new and useful Improvement in Automatic Brake-Hangers, of which the following is a specification.

The object of my invention is to provide a brake hanger which will always cause the brake shoe to swing true against its car wheel, and which will never become loose or "chatter." This object is accomplished by my invention, certain embodiments of which are hereinafter set forth.

For a more particular description of my invention, reference is to be had to the accompanying drawings forming a part hereof, in which:

Figure 1 is a sectional view taken on the line 1—1 of Fig. 2 looking in the direction of the arrows. Fig. 2 is a side elevation of one form of my improved hanger. Fig. 3 is a sectional view of a further modification. Fig. 4 shows a different means for securing a bolt. Fig. 5 is a sectional view of a further modification. Fig. 6 is a front elevation of another modification of my invention.

Throughout the various views of the drawings, similar reference characters designate similar parts.

Referring to Fig. 1. The hanger 1 comprises parallel rods 3 & 4 on each side of lugs 5 & 6, the lug 5 being fixed to the frame 7 of the truck in the usual manner, and the lug 6 to the brake beam or brake head, neither of which are shown. The lugs 5 & 6 are each perforated for bolts 8 & 9 respectively, and recessed to receive the perforated balls 10 which are preferably spherical in outline and also are perforated to receive the bolts. The rods 3 & 4 have enlarged openings 11 through which the bolts pass, and at their inner ends have spherical recesses to receive the balls 10. As the bolts 8 & 9 are identical, a description of one will answer for both. Each of them is provided with a head 12 which is preferably given the surface of a sphere at 13 to fit a corresponding washer 14 between it and the rod 4. At their other ends these bolts are provided with ordinary nuts 15 and washers 16 which bear against springs 17 surrounding the bolts and pressing against washers 18 on these bolts, which washers are also against the rod 3. In this construction the hanger 1 can swing in any direction as may be necessary to compensate for transverse movement between the wheels and truck because of the ball and socket connections between the rods 3 & 4 and lugs 5 & 6. The springs 17 take up all looseness and so automatically take up all wear incident to use.

In Fig. 3 is shown the same structure, except that instead of the balls 10 are cones 19 which fit corresponding openings in lugs 20 and 21. The outer ends of the cones 19 are reduced and made square at 22 and fit corresponding openings in the rods 23. In this structure there is no movement in the direction of the axis of the bolts.

In Fig. 5 is shown a slightly different modification from the structure of Fig. 1 in that cones 24 are substituted for the balls 10. These cones 24 are each made double and fit corresponding recesses or openings in the lugs and rods.

In Fig. 4 is disclosed another form of bolt which is more positive and less elastic in its action than the bolts 8 & 9. In this form the nut 15, washer 16 and spring 17 are dispensed with and in their place is substituted the following combination. The bolt 25 has a rectangular perforation through which passes a wedge 26, the opening being made to fit said wedge and the lower end of this wedge 26 passes through a bracket 27 fixed to the rod 28 of the brake hanger. The lower end of the wedge 26 is surrounded by a spring 29 which presses against the bracket 27 and a nut and washer 30 on the end of the wedge 26. A washer 31 separates the wedge 26 from the rod 28. The action of this wedge is simple. As the parts wear, the spring 29 draws the wedge farther through the opening in the bolt 25 thereby compensating for this wear. In Fig. 6 is shown this wedge adjustment applied to a brake hanger 32 where the entire compensation for wear at both ends is taken up by the wedge 33 on the longitudinal bolt 34. The wedge 33 having the same structure and function as the wedge 26.

It is not essential that the balls 10 or cones 22 & 24 be made separate and independent and then placed on their respective bolts as above described although this is the preferred construction. It is obvious that these balls or cones may be made integral with the rods 3 & 4, or 23 of the brake hanger. This applies to both ends of the rods.

The various features of my invention may be utilized in many forms so that it is not to be considered as limited to the precise disclosure herein made, but as broad enough to cover all structures that come within the scope of the annexed claims.

Having described my invention, what I claim is:

1. In a hanger of the class described, means for supporting the same, a bolt passing through said means, balls on said bolt and spring controlled means for drawing said parts together.

2. In a hanger of the class described, means for supporting the same, a bolt transversely through said means, balls on said bolt and on each side of said means, and filling recesses in the same; arms also threaded on to said bolts and recessed to fit said balls, and spring controlled means for drawing said parts together.

3. In a hanger of the class described, a bolt having a slot near one end, a perforated bracket secured to a part of said hanger and adjacent to said slot, a wedge passing through said slot and perforated bracket, and a spring having one end impinging upon said bracket, and its other end impinging against an attachment to said wedge, whereby the spring causes the wedge to be drawn into said slot.

4. In a hanger of the class described, means for supporting the same, spring controlled means for holding the parts of said hanger together, and means for permitting a universal movement of one part of the hanger with regard to another.

Signed at the city of Philadelphia, county of Philadelphia, and State of Pennsylvania, this 12th day of March, 1906.

SAML. M. CURWEN.

Witnesses:
H. A. HEULINGS,
WM. M. LLOYD, Jr.